(12) United States Patent
Vezzani

(10) Patent No.: US 11,021,326 B2
(45) Date of Patent: Jun. 1, 2021

(54) CONVEYING APPARATUS FOR LONG PASTA

(71) Applicant: CYBORGLINE SA, Paradiso Lugano (CH)

(72) Inventor: Giuseppe Vezzani, Paradiso Lugano (CH)

(73) Assignee: CYBORGLINE SA, Paradiso Lugano (CH)

( * ) Notice: Subject to any disclaimer, the term of this patent is extended or adjusted under 35 U.S.C. 154(b) by 0 days.

(21) Appl. No.: 16/968,197

(22) PCT Filed: Feb. 9, 2018

(86) PCT No.: PCT/IB2018/050804
§ 371 (c)(1),
(2) Date: Aug. 7, 2020

(87) PCT Pub. No.: WO2019/155260
PCT Pub. Date: Aug. 15, 2019

(65) Prior Publication Data
US 2020/0391949 A1 Dec. 17, 2020

(51) Int. Cl.
*B65G 15/08* (2006.01)
*B65B 1/32* (2006.01)
(Continued)

(52) U.S. Cl.
CPC .............. *B65G 15/08* (2013.01); *B65B 1/32* (2013.01); *B65B 19/34* (2013.01); *B65B 35/24* (2013.01); *B65G 15/02* (2013.01); *B65G 15/24* (2013.01); *B65G 21/2081* (2013.01); *B65G 23/04* (2013.01); *B65G 47/763* (2013.01); *B65G 2201/0202* (2013.01); *B65G 2201/0217* (2013.01)

(58) Field of Classification Search
CPC ........ B65G 15/08; B65G 15/02; B65G 15/24; B65G 21/2081; B65G 23/04; B65G 47/763; B65G 2201/0202; B65G 2201/0217; B65G 47/66; B65G 15/22; B65B 1/32; B65B 19/34; B65B 35/24
See application file for complete search history.

(56) References Cited

U.S. PATENT DOCUMENTS 1,030,479 A 6/1912 Ofstad
3,561,587 A 2/1971 Schausten
(Continued)

FOREIGN PATENT DOCUMENTS

DE 2262888 A1 * 7/1974 ............... A21B 3/07
DE 4315021 A1 * 11/1994 ............. B65G 15/02
(Continued)

OTHER PUBLICATIONS

International Search Report dated Nov. 6, 2018.

*Primary Examiner* — Mark A Deuble
(74) *Attorney, Agent, or Firm* — Jacobson Holman PLLC

(57) ABSTRACT

An apparatus (5) for conveying long pasta (2) between at least one production station (3) and at least one weighing and packaging station (4), comprising at least one rectilinear conveyor belt (6) and at least one curved conveyor belt (7), the long pasta (2) being arranged directly on the belts (61, 71) orthogonally with respect to the advancing direction. (FIG. 3).

8 Claims, 5 Drawing Sheets

(51) Int. Cl.
*B65B 19/34* (2006.01)
*B65B 35/24* (2006.01)
*B65G 15/02* (2006.01)
*B65G 15/24* (2006.01)
*B65G 21/20* (2006.01)
*B65G 23/04* (2006.01)
*B65G 47/76* (2006.01)

(56) References Cited

U.S. PATENT DOCUMENTS

| | | | | |
|---|---|---|---|---|
| 5,439,098 | A | * | 8/1995 | Bonnet .................. B65G 15/02 198/831 |
| 5,695,042 | A | * | 12/1997 | van der Burgt ....... B65G 15/24 198/600 |
| 5,992,615 | A | * | 11/1999 | Muchalov ............. B65G 15/02 198/831 |
| 10,899,548 | B2 | * | 1/2021 | Sachs .................... B65G 15/24 |
| 2007/0017786 | A1 | * | 1/2007 | Hosch .................. B65G 21/105 198/841 |
| 2012/0067693 | A1 | * | 3/2012 | Suzuki .................. B65G 47/24 198/339.1 |
| 2014/0048388 | A1 | * | 2/2014 | Hefner .................. B65G 15/24 198/606 |
| 2015/0157034 | A1 | * | 6/2015 | McEntire, Jr. ......... B26D 7/088 426/335 |
| 2017/0008705 | A1 | * | 1/2017 | Sammauro ............. B65G 15/62 |
| 2017/0043958 | A1 | * | 2/2017 | Muchalov ............... B65G 23/16 |
| 2019/0241370 | A1 | * | 8/2019 | Van Blokland ........ B65G 23/44 |

FOREIGN PATENT DOCUMENTS

| | | | |
|---|---|---|---|
| DE | 1027986 | 12/2002 | |
| EP | 0352968 | 1/1990 | |
| EP | 2927164 | 12/2013 | |
| FR | 2447878 A1 * | 8/1980 | ............ B65G 15/02 |
| JP | H06321331 | 11/1994 | |
| WO | WO-2019215225 A1 * | 11/2019 | ............ B65G 21/14 |

* cited by examiner

CONVEYING APPARATUS FOR LONG PASTA

BACKGROUND OF THE INVENTION

The present invention relates to a conveying apparatus for long pasta.

Long pasta, for example spaghetti, is conveyed from production lines to devices for weighing and packaging by bucket conveyors.

Due to the elongated shape, the pasta is poured into buckets which are moved by chains and known motorization means.

Disadvantageously, in order to convey the long pasta between two areas of a plant, for example between a production station and a weighing and packaging station, it is necessary to use an intermediate component, namely the buckets, with an elevated risk of the pasta breaking during the loading and unloading phase of the bucket.

In order to overcome the problem, it is necessary to reduce the conveying speed considerably, while the percentage of pasta having to be discarded as a result of breakage nonetheless remains significant.

Disadvantageously, the conveying apparatus becomes very complicated to realize and manage.

SUMMARY OF THE INVENTION

It is an object of the present invention to realize conveying apparatus for long pasta which allows a continuous movement of the long pasta, also in case of changing direction or height.

It is a further object of the present invention that said apparatus allows a high and regular conveying speed, which does not cause the long pasta to break.

It is an even further object of the present invention that said apparatus is simple to assemble and easy to maintain for ordinary technicians.

According to the invention, said and further objects are achieved with apparatus as defined in the claims.

Advantageously, the apparatus guarantees the continuous and orderly conveying of the long pasta, without breakage.

Every part of the apparatus is easily accessible and modular, so as to adapt easily to different geometries of the plant comprising said apparatus.

DESCRIPTION OF THE DRAWINGS

These and other characteristics of the present invention will become more apparent from the following detailed description of a practical embodiment shown by way of a non-limiting example in the attached drawings, wherein.

DETAILED DESCRIPTION OF THE INVENTION

Figure 1:
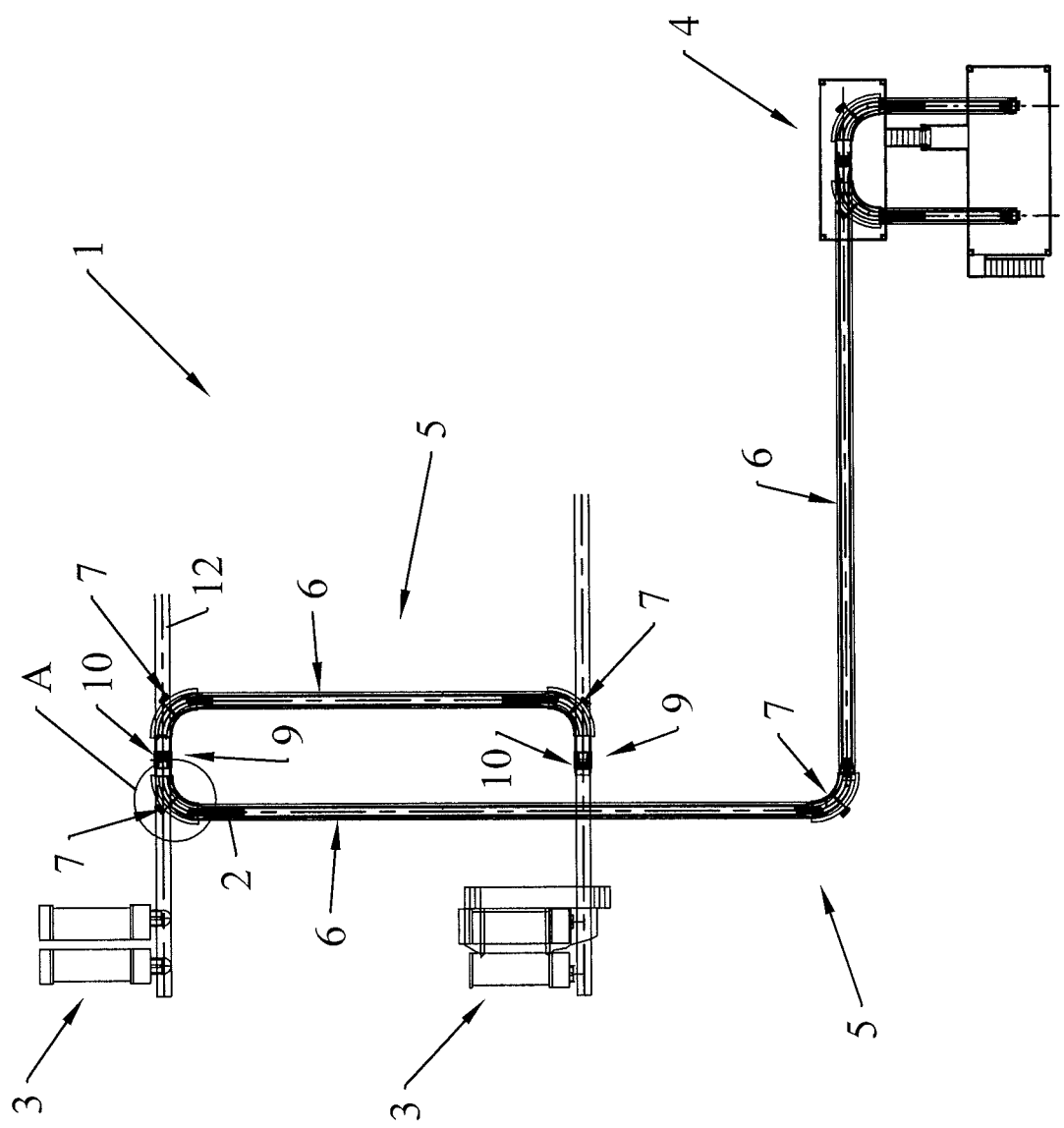
FIG. 1 shows a top plan view of a plant provided with a conveying apparatus according to the present invention.

A plant 1 for producing, weighing and packaging long pasta 2 comprises two production stations 3 for the long pasta 2, and a weighing and packaging station 4 for the long pasta 2. The plant 1 can comprise only one production station 3 or more than two production stations 3.

Said plant 1 further comprises an apparatus 5 for conveying the long pasta 2 between two production stations 3 and said weighing and packaging station 4.

Figure 2:
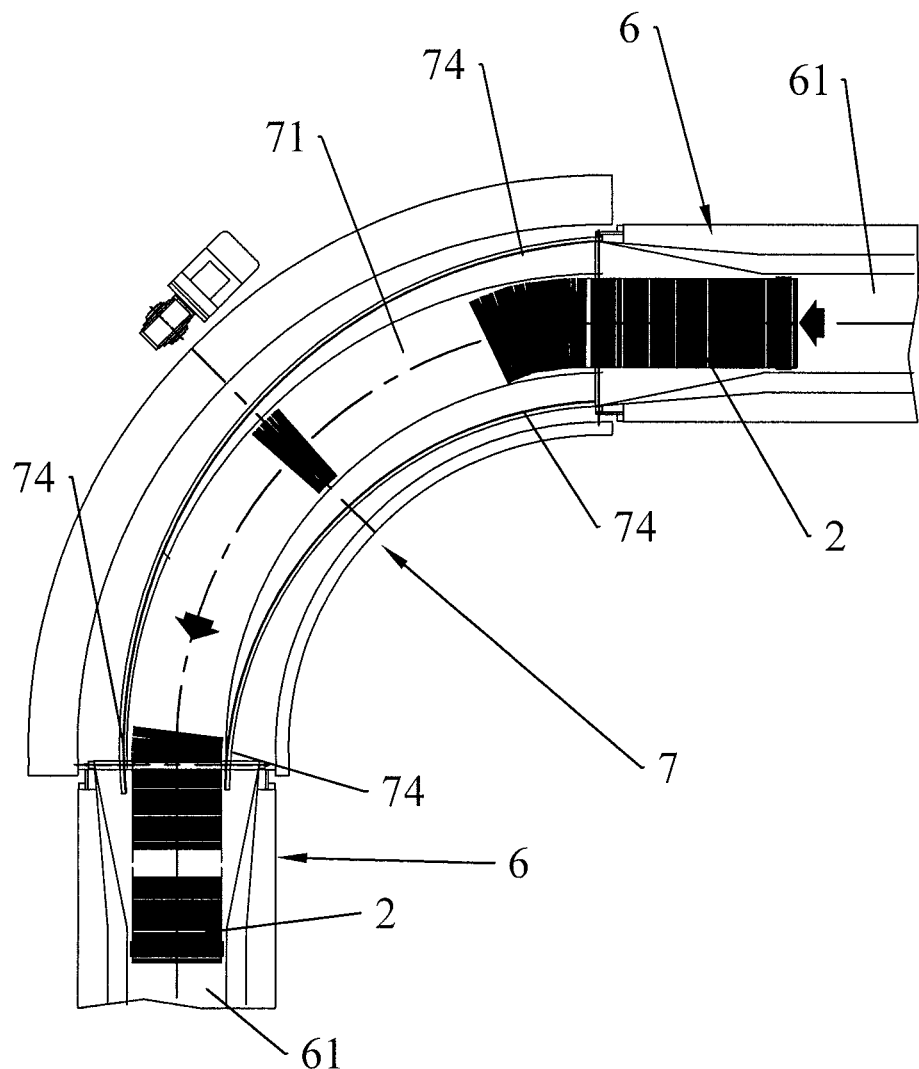
FIG. 2 shows an enlarged portion of the apparatus contained in circle A of FIG. 1.

The apparatus 5 comprises a plurality of rectilinear conveyors 6 connected by curved conveyors 7 (FIG. 2).

The conveyors 6, 7 are of belt type, and have belts for resting the long pasta 2, possibly also at different heights.

Figure 3:
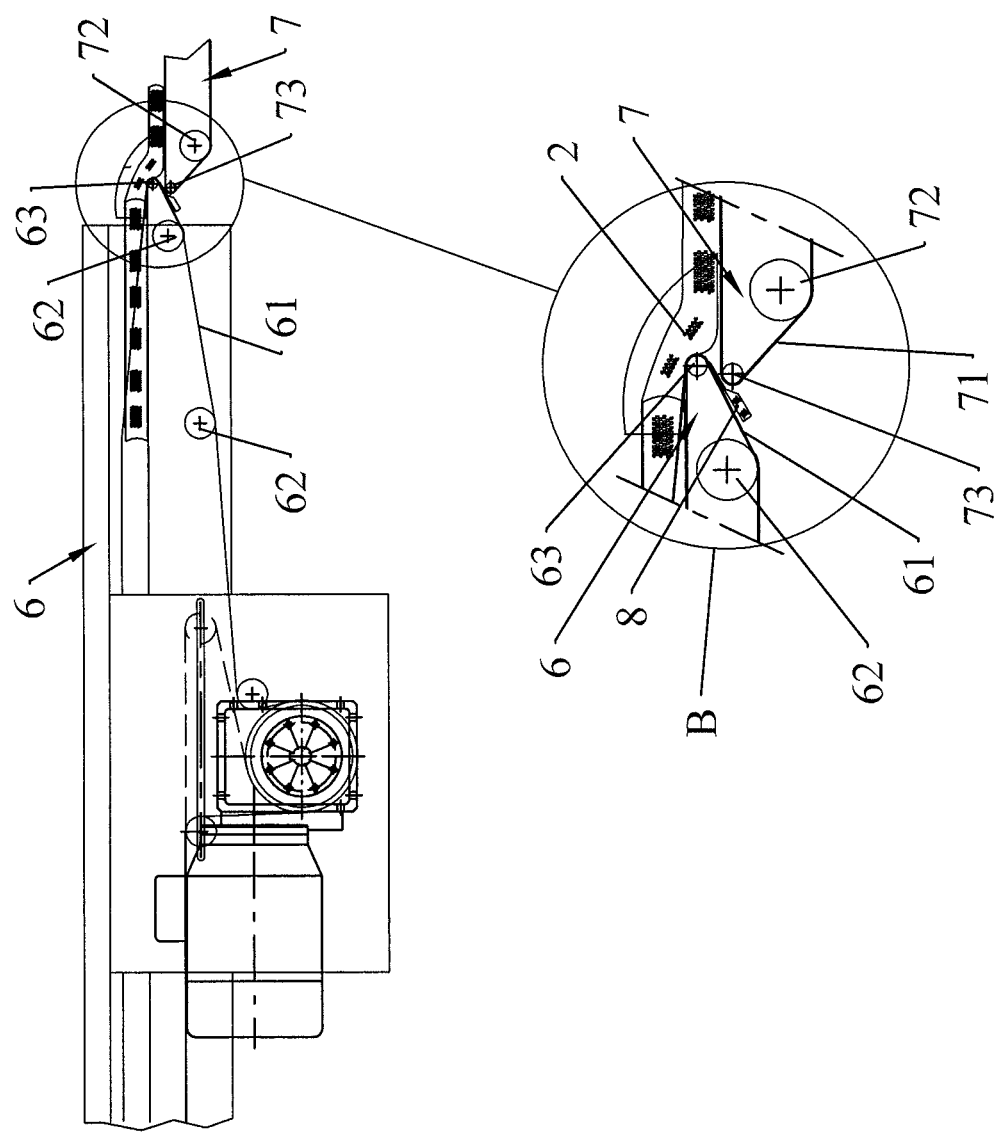
FIG. 3 shows a side view of a portion of the apparatus, in which the transfer of the long pasta takes place from a first conveyor to a second conveyor, an enlarged part being represented in circle B.

FIG. 3 shows a belt 61 of a rectilinear conveyor 6 which, in the transfer area of the long pasta 2, overlaps a belt 71 of a curved conveyor 7.

The conveyors 6, 7 include rollers 62, 72 and end rollers 63, 73.

The rollers 62, 72 and the end rollers 63, 73 can be tensioning rollers or motorization rollers.

The diameter of the end rollers 63, 73 is smaller than the diameter of the rollers 62, 72.

Considering the direction of movement of the long pasta 2, from the conveyor 6 to the conveyor 7, the center of the end roller 63 of the belt 61 is ahead of the center of the end roller 73 of the belt 71 (FIG. 3), the first conveyor 6 thus overlapping the second conveyor 7.

In this way, the continuous movement of the long pasta 2 is also guaranteed in the transfer areas between two conveyors 6, 7.

To prevent the long pasta 2, which is very thin, from slipping between the two belts 61, 71, the apparatus 1 is provided with a scraper 8 comprising an end able to be slidingly inserted between said belts 61, 71 and able to oppose the insertion of the long pasta 2 between said belts 61, 71.

The reduced size of the end rollers 63, 73 allows the overlapping portions between two conveyors 6, 7 to be reduced, the scraper 8 nonetheless guaranteeing the safe transfer of the long pasta 2 without loss and/or without the apparatus 5 stopping.

The conveyors 6, 7 can define an inclined path, namely with ends at different heights.

Preferably the belts 61 of the rectilinear conveyors have a concave transverse section to favor the centering of the long pasta 2 during movement.

Figure 5:
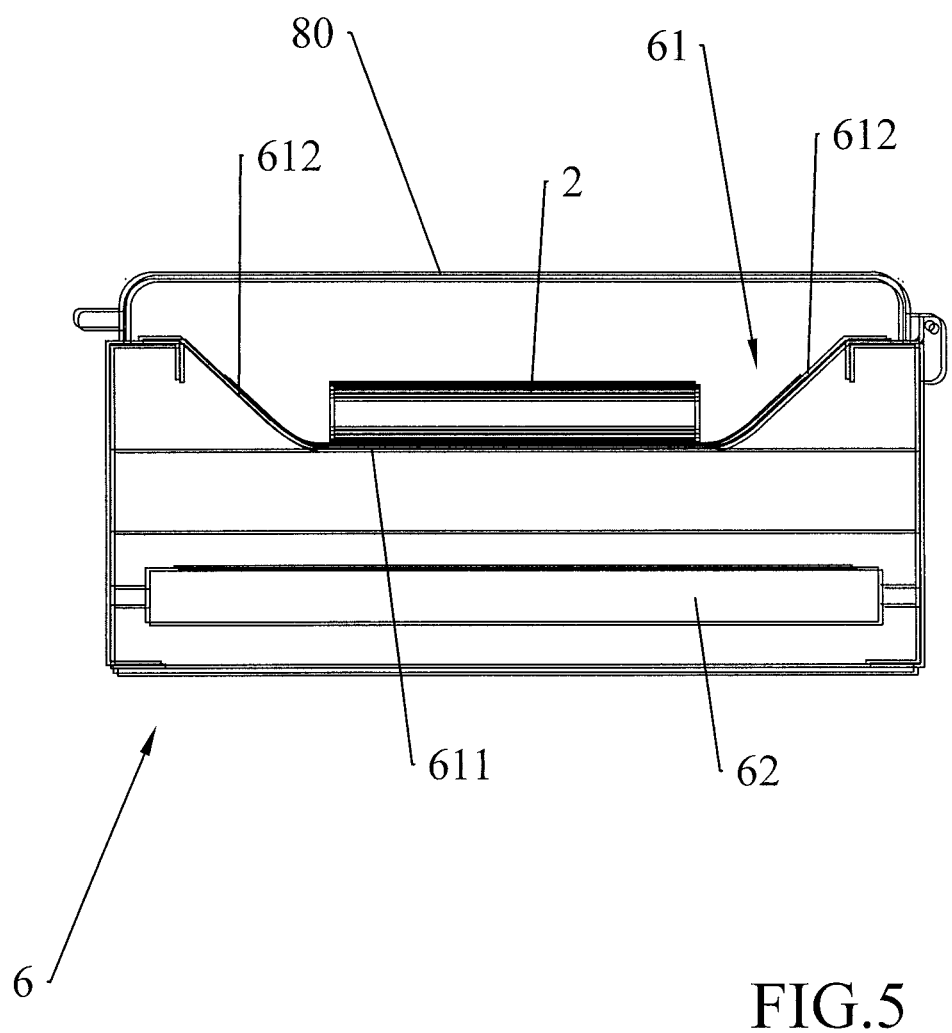
FIG. 5 shows a sectional view transverse to the movement of a rectilinear conveyor.

In particular, as represented in FIG. 5, the belt 61 comprises a central flat portion 611 wherein the long pasta 2 rests transversely, and two lateral portions 612 able to confer said concave shape, favoring the preservation of the long pasta 2 on the central flat portion 611.

FIG. 5 also shows a cover 80.

Scrapers 8 are provided between two consecutive conveyors of the apparatus 1, possibly also between two rectilinear conveyors 6 which can overlap in the same way as the conveyors 6, 7 described above.

The long pasta 2 is arranged orthogonally with respect to the advancing direction, namely the direction of the length of said long pasta 2 is orthogonal to the advancing direction on the conveyors 6, 7.

The curved conveyors 7 present sides 74 at a varying distance; in particular, the space (transverse to the conveying direction) between said sides 74 narrows in the outlet area in order to facilitate the collection of the long pasta 2.

In the outlet area, the distance between said sides 74 is slightly greater than the length of the long pasta 2.

Figure 4:
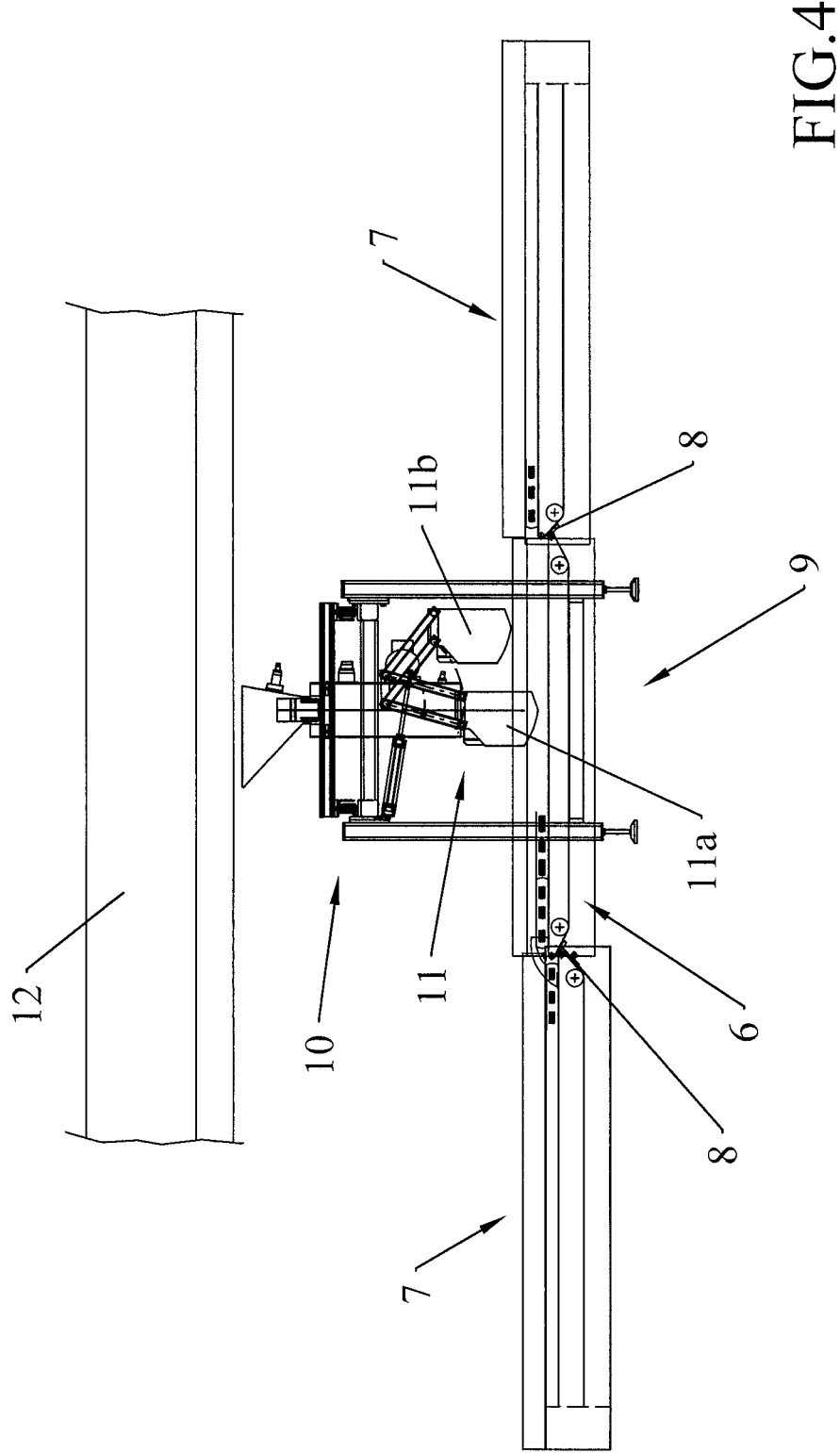
FIG. 4 shows a side view of a portion of the apparatus, in which the loading of the long pasta takes place.

The apparatus 5 is provided with loading areas 9 for the long pasta 2 by descending means 10 with sectors 11 movable between an unloading position 11a and a waiting position 11b (FIG. 4).

In particular, when the long pasta 2 coming from one of the production stations 3 by a conveyor 12 has been loaded, operating means command the ascent of the sector 11 from the unloading position 11a to the waiting position 11b, so that the sector 11 does not block the passage of the long pasta 2.

If there is more long pasta 2 to be loaded, the sector 11 is brought back to the unloading position 11a.

Advantageously, the apparatus 1 guarantees the continuous and orderly conveying of the long pasta 2, without breakage.

Every part of the apparatus 5 is easily accessible and modular, so as to adapt easily to different plant geometries.

The invention claimed is:

1. Apparatus for conveying long pasta between at least one production station and at least one weighing and packaging station, comprising at least one rectilinear conveyor belt and at least one curved conveyor belt, the long pasta being arranged directly onto belts orthogonally with respect to the advancing direction,
   a first conveyor belt comprises a belt able to overlap a belt of a second conveyor belt in a transfer area of the long pasta between said first conveyor belt and said second conveyor belt,
   the improvement comprising
   said first and second conveyor belts each have main rollers and end rollers,
   the diameter of said end rollers being smaller than the diameter of the main rollers,
   in the direction of movement of the long pasta, from the first conveyor belt to the second conveyor belt, the center of the end rollers of the belt of the first conveyor belt being ahead the center of the end rollers of the belt of the second conveyor belt.

2. The apparatus according to claim 1, wherein there is at least one scraper inserted between the first and second two conveyor belts, guaranteeing the transfer of the long pasta between the first conveyor belt and the second conveyor belt.

3. The apparatus according to claim 2, wherein the scraper has an end to be slidingly inserted between said first and second belts and which prevents the insertion of long pasta between said belts.

4. The apparatus according to claim 1, wherein the curved conveyor belt has sides at varying distance, the space between said sides narrowing in an outlet area to facilitate the collection of the long pasta at the end of a curve of the conveyor.

5. The apparatus according to claim 1, wherein the belt is rectilinear and has a concave transverse section.

6. The apparatus according to claim 5, wherein the belt has a central flat portion wherein the long pasta rests transversely, and two lateral portions which create said concave transverse section shape.

7. A plant for producing, weighing and packaging long pasta comprising at least one production station for the long pasta, and at least one weighing and packaging station for the long pasta, wherein it comprises an apparatus for conveying the long pasta between said at least one production station and said at least one weighing and packaging station, according to claim 1.

8. The plant according to claim 7, wherein it comprises at least one descending means in a loading area of the apparatus for conveying the long pasta coming from the at least one production station of the long pasta, said descending means comprising a sector movable between an unloading position and a waiting position for the long pasta.

* * * * *